July 8, 1924.
W. E. WILLIAMS
WHEEL RIM
Filed Sept. 23, 1920
1,500,291
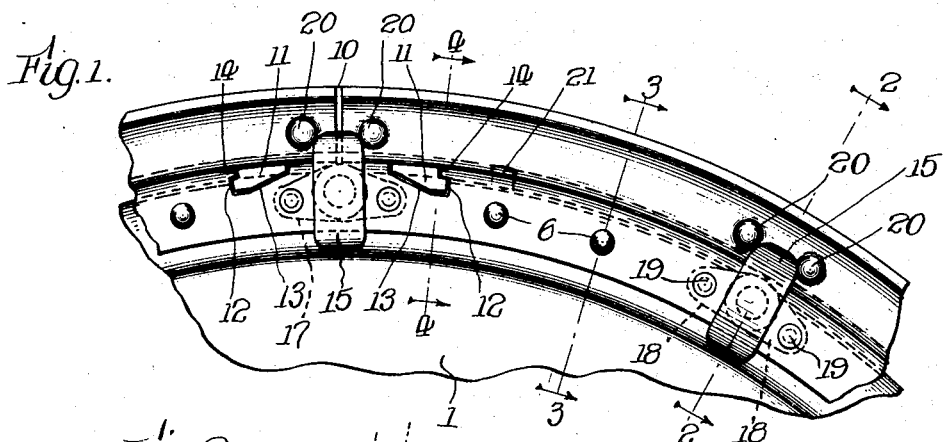
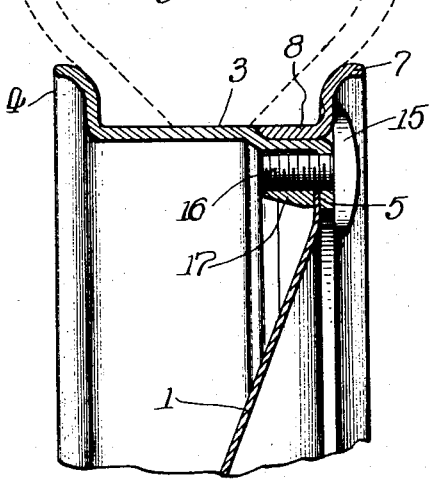
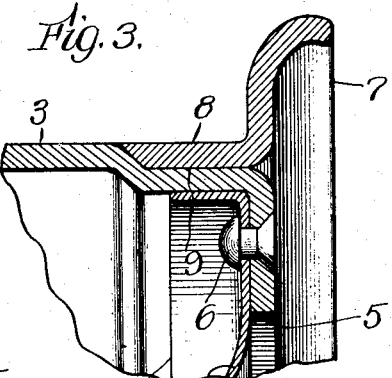
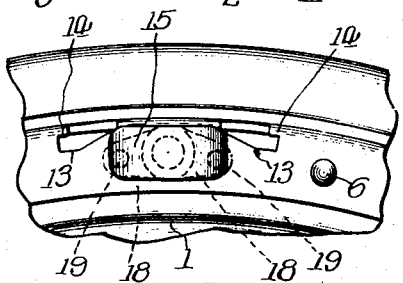
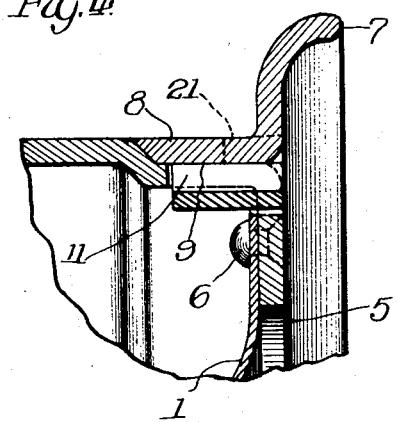
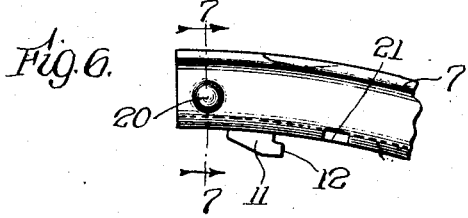
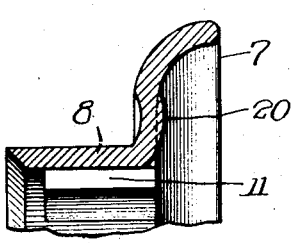
Witness:
B. J. Bernhard
Inventor:
W. E. Williams Patented July 8, 1924.

1,500,291

UNITED STATES PATENT OFFICE.

WILLIAM ERASTUS WILLIAMS, OF CHICAGO, ILLINOIS, ASSIGNOR TO AMERICAN STEEL FOUNDRIES, OF CHICAGO, ILLINOIS, A CORPORATION OF NEW JERSEY.

WHEEL RIM.

Application filed September 23, 1920. Serial No. 412,159.

*To all whom it may concern:*

Be it known that I, WILLIAM ERASTUS WILLIAMS, a citizen of the United States, a resident of Chicago, in the county of Cook and State of Illinois, have invented a new and useful Improvement in Wheel Rims, of which the following is a specification.

My invention relates to rims of the class that are used with pneumatic tires for automobiles and the purpose of the invention is to produce a very cheap rim that may be made out of flat stock when desired instead of special rolled sections and will permit the tire to be easily and quickly removed and replaced and yet be a very substantial rim. Further, my rim is especially desirable for use with what are known as disk wheels but may also be used with any type of wheel.

The invention is set forth in the claims.

Reference will be had to the accompanying drawing in which Figure 1 is an elevation of a portion of my rim.

Figure 2 is a transverse section of the rim on line 2—2 of Figure 1.

Figure 3 is a transverse section on line 3—3 of Figure 1.

Figure 4 is a transverse section on line 4—4 of Figure 1.

Figure 5 is an enlarged detail showing the locking feature for the detachable side flange or ring, when the latter is removed.

Figure 6 is an enlarged side elevation of one end of the detachable ring or flange.

Figure 7 is a section on line 7—7 of Figure 6.

I have shown with this rim a single disk forming the web of the wheel. This disk takes the place of wires for spokes, wooden spokes, or any other webbed members for a wheel, in so far as it makes connection between the rim and the hub. However, my rim is particularly well adapted for use with wire and disk wheels.

In the drawing 1 indicates the disk or web portion of the wheel to which the rim is affixed and this is shown in the form of a tapered disk having a flange 2 Fig. 3 turned over on the edge thereof. 3 indicates the main portion of my rim having the side flange 4, for the pneumatic tire, integral therewith.

Near its right hand margin, as seen in Fig. 3, the member 3 is offset toward the center of the wheel to form a seat 9 and a plane annular flange 5, projecting still farther toward that center, and to this flange the web 1 is secured by rivets 6. 7 designates a detachable rim flange member, or ring, having an approximately cylindrical tire-receiving portion 8 the outer surface of which registers with the tire receiving surface of the rim portion 3 while its inner surface closely fits the seat 9.

The member 7 is divided as shown at 10, Fig. 1, and to it, on each side of the point of division, are secured locking blocks 11 having projections 12 to enter notches 13 in the members 5, 3 and extend beneath the portion 9 of the latter and prevent the ends of the ring from moving outward, in case the resiliency of the tire and the member 7, which firmly clasps the seat 9, are insufficient. Further, the blocks 11 always ensure placing the member 7 in the same position with respect to its companion, so that the parts on each side of 10 may both lie under the same fastener, shown in this case as one of a series of screw studs 16, having, preferably but not necessarily, oblong heads 15, engaged by nuts 17 provided with flanges 18 fixed to the rim flange 5 by rivets 19, although the nuts may be otherwise secured. The studs are screwed home to bring their oblong heads into radial position and against the member 5 as closely as may be when the heads are thus radial.

In order to hold these button heads 15 against rotating out of locking position when the tire is in service, I emboss projections 20 in the side of the ring 7 on each side of the button heads 15. These projections are only slight ones but are sufficient to keep the studs 16 from turning when there is inflation pressure on the inside of the tire. However, when the pressure is down and the tire is to be removed, the studs 16 with the button heads 15 are revolved 90 degrees only as is shown in full lines in Figure 5, in which position the heads 15 are clear of the sweep of the ring 7 and the ring 7 may then be easily removed by being withdrawn laterally from its seat on the main rim portion. To facilitate this removal holes 21, Fig. 6, are provided for inserting a screw driver.

When the ring 7 is removed there is ample clearance over the surface or seat 9 of the main ring to aid in withdrawing the tire from the rim. Further there is not the common and objectionable gutter or flange on the outer edge of this rim to catch the inside sharp edge of the inside bead when it is being pulled from the tire.

This rim construction readily lends itself to use with wheels having wire spokes or wood spokes, but such modifications are not herein described.

Claims:

1. The combination with a wheel web, of a main tire receiving rim member having at one margin an outwardly extending flange and at the other side an inwardly offset portion merging into an inwardly extending flange overlapping and rigidly fixed to said web, and a transversely divided rim ring having an outer tire retaining flange and a portion fitting over said inwardly offset portion and forming, peripherally, an extension of the tire receiving surface of the main rim member.

2. The combination with a main rim portion having on one side a tire flange, externally reduced near the opposite side and at the corresponding margin provided with an annular flange extending inwardly parallel to the plane of the wheel, of a transversely divided side ring telescoping the reduced part of said portion and peripherally forming a continuation of the tire receiving surface of said portion, means for locking the ends of the side flange against outward displacement, and means for detachably locking the ring against moving from the said portion.

3. The combination with a main rim portion having at one margin only a tire retaining flange and at the other an inwardly extending flange, of a side ring having a tire-retaining flange projecting outwardly in the plane of the inwardly extending flange and a portion in position to receive a part of the surface of a tire encircling said main portion, and a series of turn buttons fitting against the inwardly extending flange and overlapping, when properly turned, said tire-retaining flange.

4. The combination with a main rim portion, of a transversely divided side ring having a sleeve-like flange telescoping one side of said portion and provided with projections for engaging in recesses in said portion to prevent radial outward movement, and a series of rotary turn buttons for detachably locking the ring against movement away from said portion, sidewise.

5. The combination with a main rim portion of a transversely divided side ring telescoping one side of said portion and having on each side of the dividing line a projection adapted to engage a corresponding laterally open recess in said portion and bar outward movement of the ends of the ring, and means for releasably securing each projection in its recess.

6. The combination with a wheel web, of a main rim portion having at one side a tire-retaining flange and on the opposite side a side-ring seat from the margin of which a plane, annular flange extends inwardly and is fixed to the web, of a side ring having a tire retaining flange and a flange fitting said seat, and a series of studs secured to said annular flange and having heads adapted to prevent the side ring from moving from the main rim portion.

Signed at Chicago, in the county of Cook and State of Illinois, this thirteenth day of September, 1920.

WILLIAM ERASTUS WILLIAMS.

Witnesses:
  B. J. BERNHARD,
  F. ZOBEL.